UNITED STATES PATENT OFFICE.

LUCIAN W. BUGBEE, OF INDIANAPOLIS, INDIANA, ASSIGNOR TO ONEPIECE BIFOCAL LENS COMPANY, OF INDIANAPOLIS, INDIANA, A CORPORATION.

PROCESS OF FINISHING THE SURFACES OF LENSES OR THE LIKE.

1,317,481.  Specification of Letters Patent.  Patented Sept. 30, 1919.

No Drawing.  Application filed March 12, 1919. Serial No. 282,207.

*To all whom it may concern:*

Be it known that I, LUCIAN W. BUGBEE, a citizen of the United States, and a resident of Indianapolis, county of Marion, and State of Indiana, have invented a certain new and useful Process of Finishing the Surfaces of Lenses or the like; and I do hereby declare that the following is a full, clear, and exact description thereof.

The object of this invention is to improve the finished surfaces of optical and other lenses requiring a highly finished surface.

The chief feature of the invention consists in simultaneously polishing and chemically treating the lens surface, or, in other words, chemically treating the lens surface while it is being polished, with the result that the nature of the lens is changed in such a way as to lower its reflection coefficient.

The reflection percentage P of a glass surface is directly related to the refractive index $n$, as stated in the formula $$P = \frac{(n-1)^2}{(n+1)},$$

and any means whereby the refractive index can be changed for the surface of the glass will change the reflection coefficient.

The foregoing is a well-known scientific fact and it is not new to treat glass surfaces chemically after the same has been polished. As the nature of the glass surface changes rapidly after polishing, it has been customary to treat chemically the surface immediately after the polishing operation, when it was desired to lower or change the reflection coefficient. This is not always feasible commercially and, furthermore, I have found that the desired result is more perfectly attained by combining simultaneously the polishing with the chemical treatment for changing the reflection coefficient.

In carrying out this invention, in practice, I have mixed the chemical material with the polishing material so that the combined material would act on the surface of the glass while it is being polished. Said material is in liquid form and is applied to the glass surface while being polished and finished.

The polishing material may be any suitable material heretofore used for polishing the surfaces of lenses for finishing the same, and also the chemical may be any suitable chemical producing the effect desired, but in practice I have used a solution of hydrogen sulfid in ammonia mixed with iron peroxid and water, but I do not wish to limit myself to these particular ingredients.

One advantage gained by the simultaneous polishing and chemical treatment is that the heat generated in the surface of the glass by the friction during the polishing thereof and the mechanical effect of rubbing said surface, materially facilitates the desired chemical action. Thereby it is possible during the polishing operation, by mixing certain chemicals with the polishing material, to more effectively and satisfactorily lower or change the reflection coefficient of the glass.

Also another result which is obtained by changing the chemical nature of the surface of the glass is the so-called selective absorption, whereby, because of the chemical change effected during the above-mentioned simultaneous polishing and chemical treatment, certain wave lengths of light, which previously would have been freely transmitted, are, after this operation, selectively absorbed. Therefore, with this process one is able, at the same time that he lowers or changes the reflection coefficient of the surface of the glass, to obtain a desired and predetermined selective absorption.

The invention claimed is:

1. In the process of finishing a glass surface, heating the glass surface, and at the same time applying thereto a chemical adapted to lower the reflection coefficient of said surface.

2. In the process of finishing a glass surface, simultaneously polishing and chemically treating said surface.

3. In the process of finishing a glass surface, mixing polishing material and a chemical material adapted to lower the reflection coefficient of the glass surface, and then polishing the glass surface with said combined materials.

4. In the process of finishing a glass surface, mixing suitable polishing material and a solution of hydrogen sulfid in ammonia.

In witness whereof I have hereunto affixed my signature.

LUCIAN W. BUGBEE.